(12) United States Patent
Mintz

(10) Patent No.: US 6,250,930 B1
(45) Date of Patent: Jun. 26, 2001

(54) MULTI-FUNCTIONAL COMMUNICATION AND AGGREGATION PLATFORM

(75) Inventor: Alex Mintz, College Station, TX (US)

(73) Assignee: Picante Communications Corporation, College Station, TX (US)

( * ) Notice: Subject to any disclaimer, the term of this patent is extended or adjusted under 35 U.S.C. 154(b) by 0 days.

(21) Appl. No.: 09/087,819

(22) Filed: May 29, 1998

Related U.S. Application Data

(60) Provisional application No. 60/048,173, filed on May 30, 1997.

(51) Int. Cl.[7] .................................................. G09B 7/00
(52) U.S. Cl. .................. 434/323; 434/118; 434/353; 434/362; 707/501
(58) Field of Search .................................. 434/322, 350, 434/118, 323, 353, 362; 705/14; 707/501

(56) References Cited

U.S. PATENT DOCUMENTS

| | | | |
|---|---|---|---|
| 5,496,175 | * 3/1996 | Oyama et al. | 434/118 X |
| 5,708,826 | * 1/1998 | Ikeda et al. | 395/762 X |
| 5,725,384 | * 3/1998 | Ito et al. | 434/350 X |
| 5,740,549 | 4/1998 | Reilly et al. | |
| 5,752,836 | * 5/1998 | Clark et al. | 434/322 X |
| 5,759,101 | * 6/1998 | Von Kohorn | 463/40 |
| 5,812,769 | * 9/1998 | Graber et al. | 395/200.12 X |
| 5,907,831 | * 5/1999 | Lotvin et al. | 705/14 X |
| 5,973,696 | * 10/1999 | Agranat et al. | 345/357 X |
| 6,014,638 | * 1/2000 | Burge et al. | 705/27 X |
| 6,021,119 | * 2/2000 | Derks et al. | 370/261 |

OTHER PUBLICATIONS

"Video E–mail Lights Up Screens". Apr. 15, 1998. Electronic Messaging News; Potomac, pp. 1–3.*

Eser Kandogan, Ben Shneiderman, Elastic Windows: Improved Spatial Layout and Rapid Multiple Window Operations, ACM AVI'96 Advanced Visual Interfaces, Gubbio, Italy, pp. 29–38, (May 1996).*

Eser Kandogan, Ben Shneiderman, Elastic Windows: Evaluation of Multi–Window Operations, ACM SIGCHI 97 Conference on Human Factors in Computing Systems, (Mar. 1997).*

Eser Kandogan, Ben Shneiderman, Elastic Windows: Design, Implementation, and Evaluation of Multi–Window Operations, Software Practice & Experience, 28(3), 225–248 (1998).*

(List continued on next page.)

*Primary Examiner*—Valencia Martin-Wallace
*Assistant Examiner*—Chanda Harris
(74) *Attorney, Agent, or Firm*—Anthony J. Casella; Gerald E. Hespos; Michael J. Porco

(57) ABSTRACT

A system and method for conducting opinion surveys using electronic mail (e-mail) as the transport mechanism is disclosed. A multimedia-enhanced e-mail message is created using an authoring tool in conjunction with a web command launcher. The enhanced e-mail message is distributed to a select set of recipients using a communication engine. The recipients individually review and respond to the questions and issues posed in the enhanced e-mail message. The responses from the various recipients are collected automatically, filtered and stored in one or more databases using a proprietary aggregation engine. The stored responses are then analyzed using an analysis engine to generate one or more reports for distribution under the direction of a user.

8 Claims, 4 Drawing Sheets

OTHER PUBLICATIONS

Eser Kandogan, Ben Shneiderman, Elastic Windows: A Hierarchical Multi–Window World–Wide Web Browser, ACM UIST'97 Symposium on User Interface Software and Technology, (Oct. 1997).*

Information about *Decisive Technology Corporation* software published on the World Wide Web at the URL: http://www.decisive.com/content.html/ and links therefrom, May 27, 1998.

Information about *Catapult's Inquisite* software published on the World Wide Web at the URL: http://www.inquisite.com/ and links therfrom, May 27, 1998.

Information about *Saja Software's Survey Select* software published on the World Wide Web at the URL: http://www.surveyselect.com/ and links therefrom, May 27, 1998.

Information about *Decision Architects' MarketSight* software published on the World Wide Web at the URL: http://www.decisionare.com/ and links therefrom, May 27, 1998.

Information about *Apian Software's Survey Pro* software published on the World Wide Web at the URL: http://www.apian.com/ and links therefrom, May 27, 1998.

Information about *IntelliQuest's Replydisk* software published on the World Wide Web at the URL: http://www.intelliquest.com/ and links therefrom, May 27, 1997.

Information about *Marketing Masters' Survey Said* software published on the World Wide Web at the URL: http://www.surveysaid.com/ and links therefrom, May 28, 1998.

Information about *GenTech's PinPoint* software published on the World Wide Web at the URL: http://www.gentech-software.com/ and links therefrom, May 28, 1998.

Information about *Merlinco's Merlinplus* software published on the World Wide Web at the URL: http://www.merlinco.co.uk/intro.html/ and links therefrom, May 28, 1998.

Information about *Princeton Cybernetics' Survey Chef* software published on the World Wide Web at the URL: http://www.princetoncyber.com/ and links therefrom, May 28, 1998.

Information about *RaoSoft's EZSurvey* software published on the World Wide Web at the URL: http://www.raosoft.com/and links therefrom, May 28, 1998.

Information about *Market First* software published on the World Wide Web at the URL: http://www.marketfirst.com/ and links therefrom, May 28, 1998.

* cited by examiner

MULTI-FUNCTIONAL COMMUNICATION AND AGGREGATION PLATFORM

CROSS REFERENCES TO RELATED APPLICATIONS

This Nonprovisional U.S. Patent Application is based upon an earlier-filed, currently pending Provisional U.S. Patent Application entitled MULTI-FUNCTIONAL COMMUNICATION AND AGGREGATION PLATFORM, Ser. No. 60/048,173, filed on May 30, 1997, in the names of Alex MINTZ, the inventor of the present application.

This currently-pending Provisional U.S. Patent Application and any Nonprovisional Patent Applications deriving therefrom in the U.S. or in other countries and the disclosure(s) contained therein are all hereby incorporated by reference herein.

DESCRIPTION

1. Technical Field of the Invention

The invention relates to the field of computer software for electronic communications and more particularly, to a system and method for automating the generation and transmission of multimedia messages and the collection, aggregation and analysis of responses thereto.

2. Description of Related Art

There is a consensus in the art that the human mind is incapable of compiling, aggregating and analyzing information from a very large number of users. Without the assistance of computers, the human mind is limited in its ability to process and analyze information sent by thousands of users and aggregate responses into a unified report and/or database.

One of the problems where the automated compilation and analysis of responses is particularly important is in the field of opinion gathering. Traditionally, this task was done using personal meetings, written surveys and telephonic interviews. However, the advent of the Internet and the low cost of electronic communications, such as by e-mail, have made it desirable to develop surveying techniques using these new tools.

However, these new media have not proven to be very adaptable to the needs of opinion gatherers. One of the principal problems faced by the use of electronic mail for conducting surveys have been the fact that electronic mail systems have largely been text-based. However, sophisticated surveyors have found that the quality of the answers they obtain depends a lot on the sophistication of the presentations used to elicit those answers. As noted above, e-mail systems have traditionally been hard to meld with multimedia materials. It has been found that response rates to surveys are significantly improved by the use of sophisticated presentations.

Another problem with the use of electronic mail as a vehicle for conducting surveys etc. has been the difficulties traditionally associated with retrieving and analyzing a plethora of responses. In traditional electronic mail systems, each response typically needs to be individually retrieved and analyzed prior to the generation of results.

Decisive Technology Corporation offers software that analyzes on-line survey responses from multiple sources. Yet, the Decisive technology software does not allow for the incorporation of multimedia images, bitmaps, video clips, web pages, browsers, data and/or documents in a survey, feedback engine, correspondence or questionnaire. Furthermore, the Decisive technology software does not allow for two-way "push" and/or "pull" of multimedia content.

Other products, such as Catapult's Inquisite, Saja Software's Survey Select, Decision Architects' MarketSight, Apian Software's Survey Pro, IntelliQuest's ReplyDisk, Marketing Masters' Survey Said, GenTech's PinPoint, Merlinco's Merlinplus, and Princeton Cybernetics' Survey Chef, RaoSoft's EZSurvey, and the Market First software, also do not allow for the incorporation of multimedia and other Object Linking and Embedding (OLE) compatible objects into a questionnaire, nor do they interface with generic decision engines that generate recommendations for an optimal decision based on the aggregated feedback to multimedia objects.

It is therefore desirable to have e-mail systems that permit the incorporation of multimedia materials and other Object Linking and Embedding (OLE) compatible objects directly into the body of an e-mail message. It has been found desirable for such multimedia materials to be directly accessible to a recipient without loading or configuring specialized plug-ins, add-ons or helper applications. It has also been found desirable for content associated with a web site to be directly included in an e-mail message.

It has also been found desirable to be able to interface an automated e-mail based opinion surveying system with one or more generic decision engines that generate recommendations for an optimal decision based on the aggregated feedback to a presented set of multimedia objects. It would be beneficial if such multimedia-enhanced e-mail could be directly routed to a desired set of recipients without requiring such recipients to have an active connection to the Internet or other communications networks.

It has also been found desirable to have automated techniques for collecting, collating, analyzing and reporting responses to opinion surveys conducted using enhanced multimedia e-mail messages.

SUMMARY OF THE INVENTION

Therefore, it is primary object of the present invention to create an mass feedback and opinion-gathering system that permits the incorporation of multimedia materials and other Object Linking and Embedding (OLE) compatible objects directly into the body of an e-mail message. It is a further object of the present invention for such multimedia materials to become directly accessible to a recipient without the loading or configuration of specialized plug-ins, add-ons or helper applications. It is yet another object of the present invention for content associated with a web site to be directly included in an e-mail message rather than as an attachment.

It is also an object of the present invention to be able to interface an automated e-mail based opinion surveying system with one or more generic decision engines that generate recommendations for an optimal decision based on the aggregated feedback to a presented set of multimedia objects. It is an auxiliary object of the present invention for such multimedia-enhanced e-mail to be directly routed to a desired set of recipients without requiring such recipients to have an active connection to the Internet or other communications networks.

Yet another object of the present invention is to develop an automated technique for collecting, collating, analyzing and reporting responses to opinion surveys conducted using enhanced e-mail messages.

The system and method of the present invention uses electronic mail (e-mail) as a transport mechanism to enable a complete automated cycle process comprising the authoring and editing of a multimedia message with a feedback element, communicating this message to a plenitude of users, collecting and aggregating the responses from a subset of these users, analyzing the aggregated data, storing the results in a database and generating one or more reports.

The present invention relates to a multi-functional horizontal software platform, comprising at its core of five engines, uniquely organized and operating in an open-sequence architecture. The platform is capable of inter-operating with past, present or future technologies, as well as vertical applications. The platform comprising an authoring and editing engine, a communication engine, a web browser command engine, an aggregation engine and an analysis and distribution engine. These engines can also be used in conjunction with other industry products thus allowing a user to develop a virtually unlimited number of applications.

The system and method of the present invention allows for the incorporation and generation of any combination of multimedia presentation capabilities in an e-mail message, questionnaire, survey or correspondence, for the aggregation/compilation of incoming information from millions of users into a single message/document, spreadsheet, or database instantaneously, simultaneously generating automatic reports in "real time", exporting the data to presentation software, word processing software applications, database packages, spreadsheet programs, and sharing and publishing the aggregated data with just the click of a button. The system and method of the present invention uniquely enables both one-to-many (broadcast) and many-to-one communications, transactions, electronic commerce and real-time aggregation and analysis in a multi-tasking, multi-media environment.

In one aspect, the present invention is a computer-implemented method of surveying the opinions of a plurality of computer users. A survey questionnaire comprising one or more multimedia elements is first created. The survey questionnaire is then distributed to a group of recipients as an enhanced multimedia e-mail message. The recipients are simultaneously requested to provide individualized responses.

The individualized responses received from recipients of the enhanced multimedia e-mail message are next aggregated. The aggregated individualized responses are finally analyzed by an analysis engine and a report is generated from the analysis. The distribution of the questionnaire to a plurality of recipients can be performed in a variety of ways, e.g., over the Internet, over a computer network, using floppy disks or using a peer-to-peer communications protocol.

In another aspect, the system and method of the present invention is a computer-implemented system for surveying the opinions of a plurality of computer users. At its core, the system includes an authoring and editing engine for creating a survey questionnaire comprising multimedia objects. The authoring and editing engine operates in conjunction with a web command engine that permits multiple active web pages (and not just hyperlinks) to be incorporated directly into an e-mail message.

The system also includes a communications engine distributes the survey questionnaire to a group of recipients as an enhanced multimedia e-mail message and requests individualized responses from each of the recipients. An aggregation engine next aggregates the individualized responses received from recipients of said enhanced multimedia, e-mail message and feeds the results into an analysis engine that analyses the individualized responses and generates reports.

In yet another aspect, the authoring and editing engine of the present invention facilitates the creation of multiple layers of multimedia objects. Furthermore, the authoring and editing engine incorporates multimedia elements directly in the body of the enhanced e-mail message rather than as attachments or hyperlinks. The enhanced e-mail messages produces by the system and method of the present invention are OLE-compliant.

The results of the analysis can be interfaced with generic decision engines that generate recommendations for an optimal decision based on the aggregated feedback to each multimedia object that was the subject of the questionnaire.

BRIEF DESCRIPTION OF THE DRAWINGS

A more complete understanding of the method and system of the present invention may be obtained by reference of the detailed description of the preferred embodiments that follow, taken in conjunction with the accompanying drawings, wherein.

DESCRIPTION OF THE PREFERRED EMBODIMENT

Figure 1:
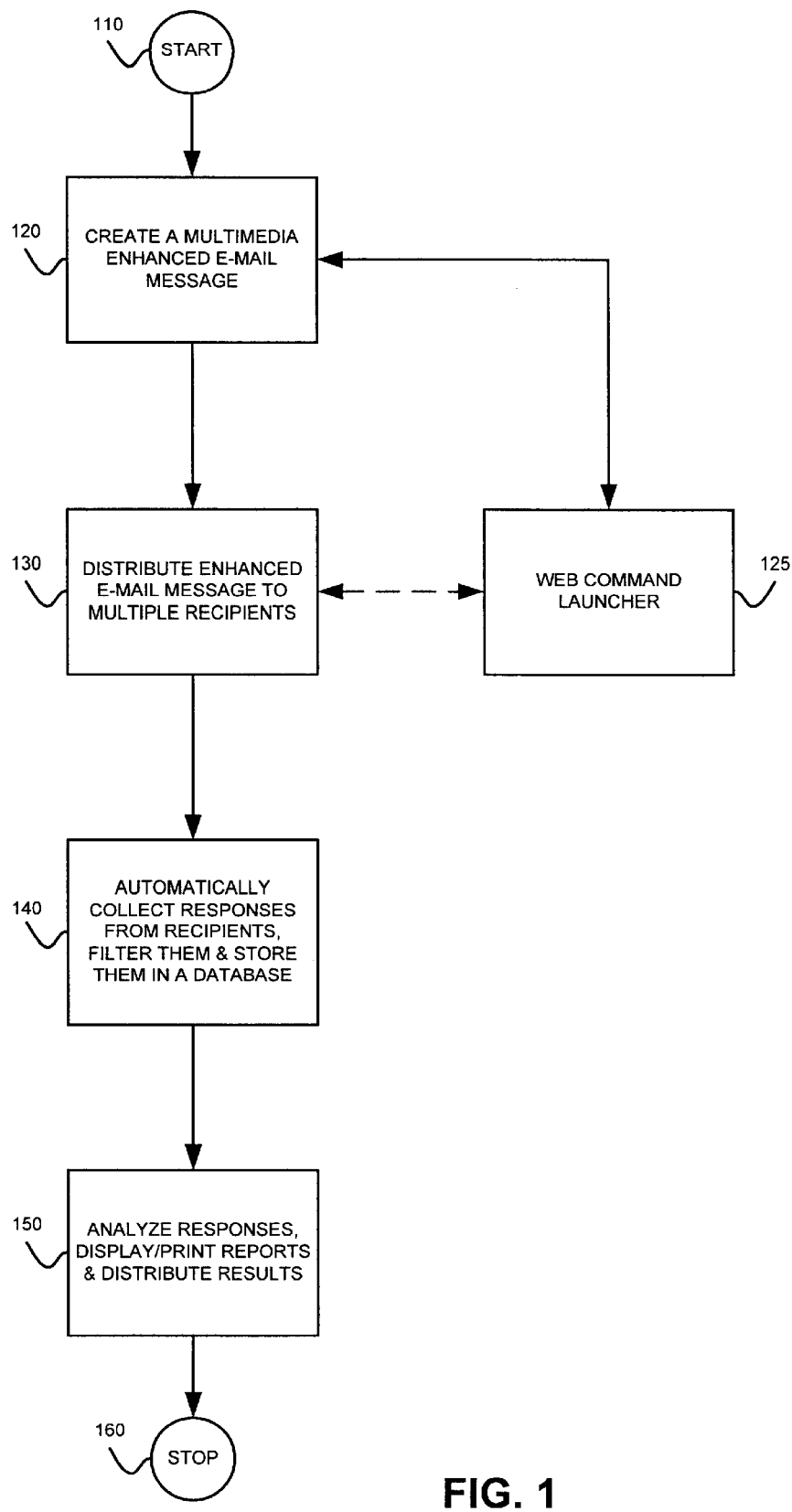
FIG. 1 is a block diagram providing an overview of the e-Logic multi-functional communication and Aggregation Platform of the present invention.

The system and method of the present invention is a tool to assist in the conduct of sophisticated opinion surveys, optionally including multimedia elements, using e-mail as the transport mechanism. FIG. 1 is an overview block diagram of operation of the e-Logic multi-functional communication and aggregation platform of the present invention. As shown in FIG. 1, the process starts at 110 with a user creating an enhanced e-mail message, optionally embodying multimedia materials and other OLE-compatible objects, as shown at 120. The creation of the enhanced e-mail message is performed using the e-Logic Authoring and Editing Engine that is described further below. As can be seen from FIG. 1, the e-Logic Authoring and Editing Engine uses the Web Command Launcher 125 to provide centralized control of multiple web-browser windows embedded within an enhanced e-mail message.

The enhanced e-mail message created at 120 is then distributed to a selected set of recipients as shown at 130. The transport and distribution tasks are handled by the e-Logic Communication Engine described in greater detail below.

The recipients of the enhanced e-mail message individually review and respond to the enhanced e-mail message. In the preferred embodiment of the present invention, there is no interaction between the recipients and the Web Command Launcher 125. In an alternative embodiment of the present invention, the review of the enhanced e-mail messages by the recipients involves some interaction with the Internet and/or Web Command Launcher 125 mentioned above. The survey responses are designed to be returned to a specific mailbox designated for this purpose. Standard e-mail transport mechanisms are used for the transmission of the messages and the return of the responses to the user.

The responses from various recipients are next collected automatically, filtered and stored in one or more databases, as shown at 140. The collection, filtering and storage of responses to an enhanced e-mail message is performed using the e-Logic Aggregation Engine that is described in greater detail below.

Finally, as shown at 150, the collated and stored responses are analyzed, and reports are generated, printed and/or displayed (as appropriate), and distributed as directed by the user. The analysis of the responses, and the generation and distribution of reports is performed using the e-Logic Analysis Engine as described below.

Thus the e-Logic system and method of the present invention comprises at least five principal engines: the e-Logic Authoring and Editing Engine, the e-Logic Web Command Engine, the e-Logic Communication Engine, the e-Logic Aggregation Engine and the e-Logic Analysis Engine. Each of these five principal subsystems of the system and method of the present invention are separately discussed in further detail below.

The e-Logic Authoring and Editing Engine

The e-Logic platform allows a user to embed in an e-mail message, memo, correspondence or survey any combination of multimedia presentation capabilities, such as web pages, single or multiple images/bitmaps, data, video, sound, ultrasound, x-rays, slides, label objects, presentation materials, as well as incorporate a variety of formats for dialog boxes such as multiple choice, agree-disagree, yes/no and drop down boxes, and questionnaires.

A variety of multimedia file formats may be embedded in an e-Logic e-mail message e.g., bitmaps (.bmp), wavetables (.wav) and advanced video (.avi). Other file formats supported by the e-Logic platform include Microsoft Word documents (*.doc), Microsoft Excel spreadsheets (*.xls), Microsoft Excel worksheets (*.xlw) and Powerpoint presentations (*.ppt). The generic Object Linking and Embedding (OLE) object in the e-Logic system permits users to include file formats that are not directly supported. A user may also include one or more browser object(s) to view Internet web pages.

The system works reliably in delivering and displaying web pages even when a user is not connected to the Internet. The e-Logic platform includes support for additional graphics file formats (such as .tif, .gif, .jpg and .pcx formats), additional sound file formats (including .ra, .ram and .midi formats), additional video file formats (including .mov, .qt, .mpg and .mv formats), as well as animated .gif and animated .jpg file formats.

The e-Logic platform of the present invention allows for customized applications to be generated that are various combinations of the above (e.g. video and sound; sound and images; spreadsheet, active web pages, video and graphics, etc.) can be embedded with no attachments. A user can design, create or author such a multimedia e-mail message, questionnaire, and/or survey and send them to groups of people (numbering even in the millions) simultaneously.

The e-Logic platform also permits the creation of multiple layers of objects. For example, sound objects (e.g., files in .wav format) can be placed on top of one or more Audio Video Interchange (AVI) objects. The AVI and Wavetable files can both be placed in turn on top of a bitmap or a series of web pages or vice versa, and all of these can be embedded in an e-mail message.

The e-Logic system and method of the present invention facilitates uniquely allows for the imbedding of bitmaps in e-mail messages that directly open web sites from within an e-mail message as well as the embedding of multiple Internet browsers directly in e-mail messages. It also allows for the viewing of an e-mail message and its multimedia inclusions in a unified window.

None of the presently available multimedia e-mail products have the breath of functionality and architecture of the e-Logic platform, nor do they have the ability to combine questionnaires and aggregation engines along with multimedia objects in an e-mail message. For example, the Media Synergy @loha software works with e-mail packages that can send and receive attachments. The Bonzi Voice e-mail software permits the inclusion of voice messages as an e-mail attachment. Softlink Inc.'s E-mail POWERLink which works like a virtual camcorder inside a computer and chronologically records whatever one says, creates, and draws on the product's "whiteboard". ImageMind Software, Visual Mail, SeeMail and Video Express offer products that allow users to create and deliver multimedia e-mails but not in combination with questionnaires.

U.S. Patent, Ser. No. 5,740,549 issued to James P. Reilly & Gregory P. Hassett describes an information and advertising distribution system. However, it should be noted that the Reilly patent does not disclose any system or method of allowing users to create and embed questionnaires in an e-mail message nor does it allow for the aggregation and analysis of replies from a multitude of recipients.

The e-Logic platform allows for the encryption of a multimedia message prior to its transmission. It also uses a variety of compression techniques to compress multimedia objects embedded in the e-mail message prior to transmitting them, thus providing a unique combination of compression and encryption in an e-mail system.

Another noteworthy aspect of the e-Logic system is that it permits users to preview the multimedia feedback or survey embedded in an e-mail using a proprietary preview mode. The e-Logic system and method of the present invention also allows for the creation of online, multimedia surveys of teams and groups.

The e-Logic Communication Engine

Most e-mail environments including the e-Logic system have several standard components: users, mail messages, sender and recipient addresses, e-mail gateways, protocols, messaging transport systems, value added networks (VANs), and directory systems.

The e-Logic software program translates all elements of a message, including any multimedia content and the message proper, into a proprietary text-based format. The enhanced message is then sent by the sender's Simple Mail Transfer Protocol (SMTP) server to the recipient's Post Office Protocol (POP) server or Internet Message Addressing Protocol (IMAP). The receiving POP or IMAP server routes the enhanced message into the recipient's mailbox.

When an enhanced message is received, the user recipient can view it as it was designed and without having to extract attachments and configure associated plug-ins, add-ons or helper applications. Since the e-Logic system is capable of transforming the multimedia e-mail message into the equivalent of a web page, the e-Logic system is independent of client receiving-end viewing, editing and interactive capabilities.

In an alternative embodiment, the mail packet, survey or questionnaire generated by the e-Logic system are transmitted via a peer-to-peer communication technique (e.g., via a direct telephonic line or other electronic or optical link) without requiring either the sender or the recipients to be connected to the Internet. The distribution of the messages as well as the aggregation of results are both performed using the e-mail format. This variant of the e-Logic system can be deployed on a Local Area Network, through importation into a network file system, or by using the Internet. The filtering of messages is performed using proprietary e-Logic headers that are SMTP-compliant.

The e-Logic Queue acts as an intermediary for all e-Logic transmissions and receptions. When configured to check mail periodically, the e-Logic Queue interrogates the POP3, server POP4 or IMAP (as appropriate) for SMTP header information. This SMTP header information permits the e-Logic Queue to distinguish between e-Logic messages and are normal e-mail messages.

The e-Logic Queue automatically transfers any new e-Logic messages (determined by scanning for) .elo, .mm or .elr file extensions received by the server since the last check for new mail. When they are detected and received, messages of the .elo and .mm message types are stored for later viewing via the e-Logic mail viewer. Messages of the .elr format are relayed to the Aggregation Engine for processing and storage in appropriate databases.

In addition to retrieving .elr messages directly from a mail server, the e-Logic Queue also acts as the association for any .elr files that the user attempts to open locally. Once activated in this manner, the e-Logic Queue treats the associated .elr files exactly as it would have, had it been retrieved from the mail server. The e-Logic Queue then relays a message dialog confirming that the appropriate transfers were completed.

Finally, the e-Logic Queue acts as an intermediary for the transmission of .elo messages from the e-Logic Composer. Once the authoring and editing engine has relinquished control of an enhanced e-Logic message to the e-Logic Queue, a user can close the e-Logic application program even before the e-Logic Queue completes the sendmail command. While the benefit of this feature may not be readily apparent when sending small numbers of questionnaires, the advantages of this feature can be best appreciated when sending large numbers of e-mail messages.

A wide variety of compression techniques and technologies have been incorporated in the e-Logic platform to shorten the time taken to transmit messages. For example, the system's video processing approach cuts to half the time it commonly takes to transmit a video clip using other video transmission schemes. Another innovative feature of the e-Logic platform is its ability to receive feedback regarding multimedia objects from a large number of online users.

The e-Logic Web Command Engine

The e-Logic system and method of the present invention also allows for the selection and launching of multiple browsers that can be incorporated into a memo, message, survey, questionnaire or direct mail piece, all of which can be simultaneously displayed on a single screen. Currently, the e-Logic system permits about fifteen independent browsers to be simultaneously (rather than sequentially) displayed on a single screen (while about fifty browsers can be simultaneously displayed on multiple screens). This allows for the simultaneous search, viewing and transmittal of multiple search engines, multiple web sites, bookmarks or any combination thereof.

The site control and launching center that is included in the present invention permits the centralized simultaneous selection and launch of multiple sites, bookmarks, multiple search engines, all from a site selection center. Thus, web pages can be embedded into an e-mail message, survey and/or questionnaire. Furthermore, such web pages included in e-Logic messages can be dynamically dragged and dropped, resized, moved, zoomed and/or deleted. The e-Logic system sends web pages directly to a user, without requiring the recipient to retrieve one or more web pages off the Internet. Instead the present invention permits an active web page to be sent directly to a user. Furthermore, a user no longer needs to open each browser separately to find or access a web site. Rather, the present invention permits a user to select the search engines/sites/bookmarks listed in a database to launch the appropriate browsers. The sites/pages/search engines can be included within an e-Logic message or survey optionally in combination with graphics/images, sound, video, data, spreadsheets, word documents, OLE objects and a series of questionnaires.

The e-Logic system's search engines uniquely enable a user to drastically reduce the time it takes to surf the Web by simultaneously launching multiple search engines to search for different items or for the same item in different places. The e-Logic system of the present invention is also capable of launching a series of subsequent web pages in a sequence as determined by hyper-links included in an initial web page as soon as a user views the original Web page.

In addition, any browser or set of browsers (including, without limitation, Navigator and Netscape's, Microsoft's Internet Explorer) can be launched from within an e-Logic message. Internet broadcast systems such as the Pointcast network, BackWeb, etc. can also be accessed from the e-Logic system.

The e-Logic Aggregation Engine

The e-Logic Aggregation Engine compiles, aggregates, analyzes and displays information received from multiple users (numbering even in the millions) stores the received data in a database, and generates graphs and reports in real time. As noted earlier, the incoming information can be in the form of replies to multimedia questionnaires, surveys, memo or text-based material. The e-Logic system's intelligent-agent-based e-mail response compilation, analysis, summary reporting and management system is capable of handling thousands of e-mail responses. Text-based messages can also be aggregated using the e-Logic system.

The e-Logic aggregation engine is a background program designed to translate an incoming response into results that can be easily utilized and viewed by other e-Logic modules. By creating and maintaining two basic databases—one to store responses and the other to store analyses—the e-Logic aggregation engine allows for a dynamic and quick method for the e-Logic system and method of the present invention to access such information.

Upon receipt of a new response, the e-Logic aggregation engine stores all relevant data from that particular reply in a database file (called "response.db") and indexes such data using the respondent's e-mail address to permit easy access to respondent-based information.

In addition to the storage of individual response information, a summary of the questionnaire is updated in the "analysis.db" file. This analyses database maintains an overview of information about respondents including basic analysis indexed by individual question IDs. The response data associated with each question are stored in different formats based upon their categorization into one of four different format types:

Standard Text Questions: The full responses of every reply received to questions of this type are stored in full-text form. Due to the necessarily unstructured nature of such responses, no additional analysis is performed by the aggregation engine on Standard Text-type replies.

Standard Numeric Question: The aggregation engine divides the complete range of all possible responses into about ten sequential "bins" or "buckets". Each of these "bins" represents a range of numbers and contains a tally representing the number of responses that fall within each range. In addition, a record is kept of the maximum, the minimum and the average values of the numeric responses.

Multiple Choice Questions: Responses to Multiple Choice questions are stored as a tally of the number of respondents that have properly selected each of the multiple responses permitted. The Multiple Choice question type includes those questions created through the use of the Yes/No (Y/N), True/False (T/F), Excellent/Poor (E/P) and Agree/Disagree (A/D) question buttons.

Text Questions: The e-Logic system is capable of performing additional analyses on text type questions after their compilation into the response database.

The core concepts underlying the e-Logic Aggregation Engine are best appreciated in conjunction with the illustration of FIGS. 2–6. The aggregation engine offers significant improvements upon current techniques for one-to-many and many-to-one communication and the creation and analysis of databases relating to the same.

Figure 2:
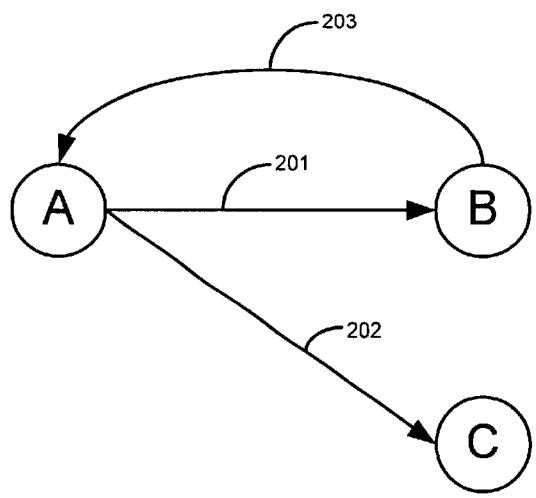
FIG. 2 illustrates the inter-user communication flow in an exemplary current e-mail system.

Current E-Mail Systems: In current e-mail systems, a user typically sends a message to another user. The receiving party may or may not respond to the original message. This is illustrated in FIG. 2 where a user A sends a first message 201 to user B. At a different moment in time, A sends a message 202 to user C. User B responds to user A by sending a message 203.

Figure 3:
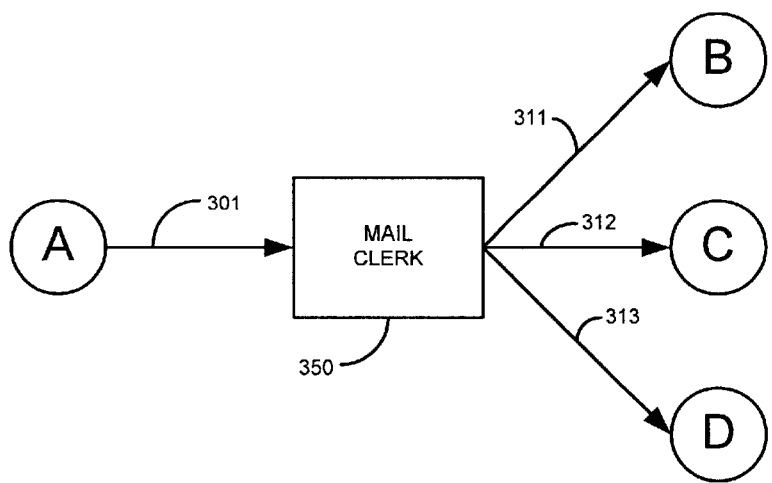
FIG. 3 illustrates the inter-user communication flow in an exemplary current distributed e-mail system.

Current Distributed E-Mail Systems: In present day distributed e-mail systems, a user sends a message (or a copy of the message) simultaneously to a group of on-line users. The message recipients may or may not respond to the original message. This is illustrated in FIG. 3 where a user A broadcasts a message 301 to users B, C & D simultaneously by sending a single message to a mail clerk 350 who makes three copies of the original message and delivers those to B, C & D as shown at 311, 312 & 313 respectively.

Figure 4:
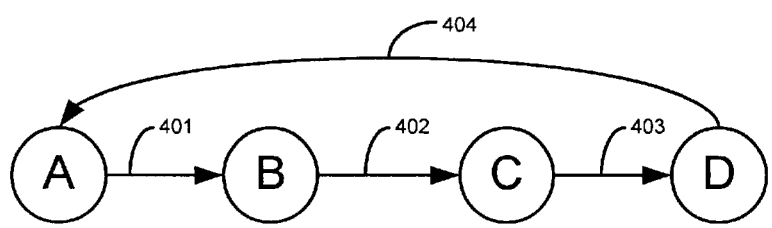
FIG. 4 illustrates the inter-user communication flow in an exemplary current routing system.

Current Routing Systems: In a routing system, a user sends a message to a list of other users. The routing system distributes the message to the users in the list following the sequence specified by the user or an administrator. This is illustrated in FIG. 4 where a user A routes a message 401 to user B who adds his comments and forwards the extended message 402 to user C. User C adds his comments too and forwards the still-extended message 403 to user D. User D adds his comments and being the final recipient on the routing list, returns the message with the comments of B, C & D to the sender A as shown at 404.

Figure 5:
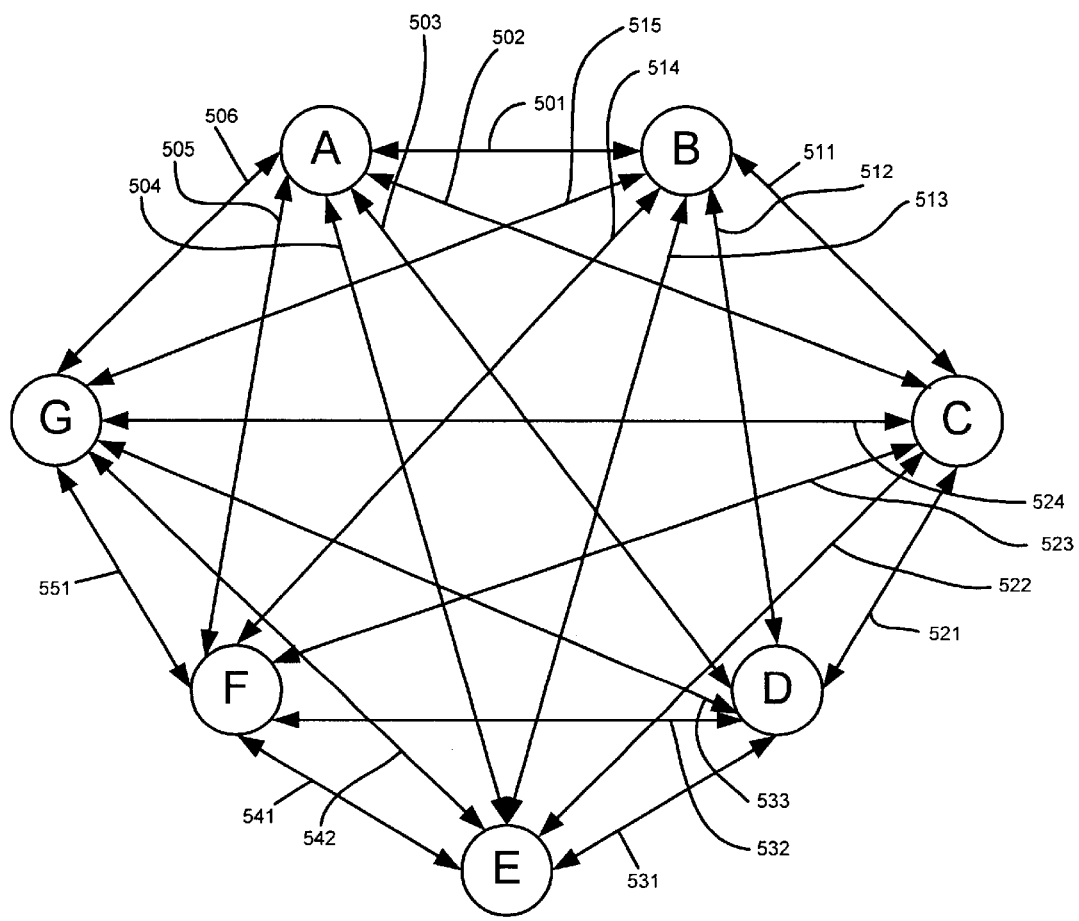
FIG. 5 illustrates the inter-user communication flow in an exemplary state-of-the-art chat system.

Current Chat Systems: In current chat systems, users communicate with each other in private or open "Chat" rooms. State of the art chat systems do not have an aggregation engine, although the e-Logic aggregation engine can be added to Chat systems to enhance their value. This is illustrated in FIG. 5 where users A, B, C, D, E, F & G associated with a "room" can send messages directly to the entire room or to select users in the room or outside as shown by the arrows 501–551.

Figure 6:
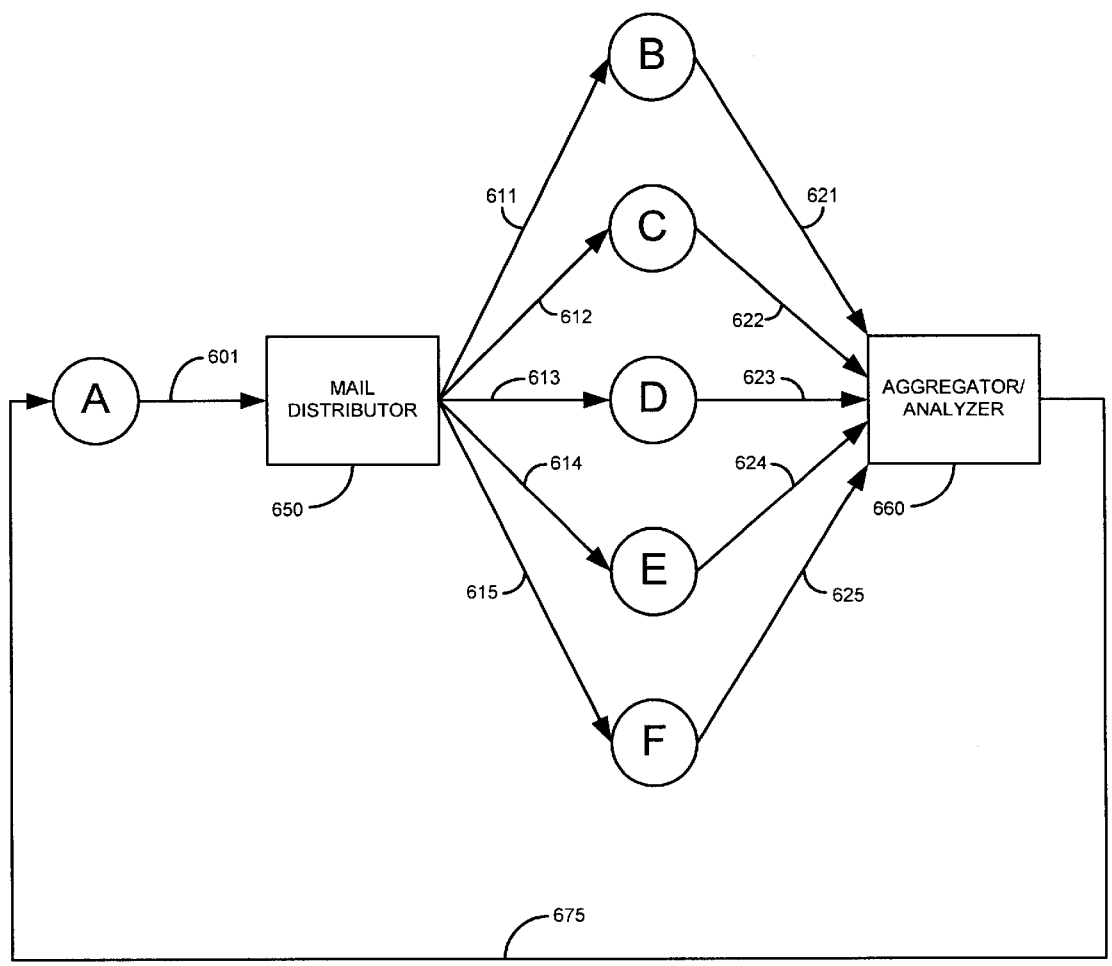
FIG. 6 illustrates the inter-user communication pattern in the e-Logic Aggregation engine of the present invention.

In contrast to the above, in the e-Logic Aggregation Engine, a user sends a multimedia message to a number of recipients. Responses are aggregated and analyzed for the user without requiring each e-mail response to be separately accessed or opened. Reports, graphs, charts and views of the data as well as the database itself can be shared with other users. The e-Logic system thus allows for one-to-many and many-to-one multimedia communication and analysis. This is shown in FIG. 6 where a user A composes an multimedia enhanced e-mail message 601 and transfers it to a Mail Distributor 650 which replicates the message as necessary and transmits these to a set of recipients B, C, D, E & F as shown at 611–615. Some or all of the recipients review the received message and respond back to the originator or a designated response collector as shown at 621–625.

The aggregation engine 660 allows the responses 621–625 to be compiled automatically into a single report or database without the need to separately "open" each of plethora of e-mail responses.

The e-Logic Analysis Engine

The e-Logic analysis engine provides a variety of analytical tools for review by the user. These include, without limitation, user summaries, question details, advanced (2D and 3D) graphs, pie charts, bar charts, comma delimited databases, such as Microsoft SQL Server, Microsoft Access, Oracle, Informix, and Sybase, and Paradox tables. It also creates a variety of (detailed and condensed) reports. These reports may contain graphs/charts and/or summaries of the compiled data.

The e-Logic system allows the aggregation of "small picture" component criteria such as by person, customer, store, office, salesperson, etc., or by the "big picture" component criteria (e.g., people who prefer flying TWA versus those who prefer United). Reports, graphs and charts generated by the e-Logic report writer can be exported and inserted into other applications such as Microsoft Power Point, Microsoft Word, Microsoft Excel, Corel Office Suite, Corel Draw, Lotus Office Suite, SPSS, SAS, etc.

In addition, the analysis engine allows for the comparison of real time data (by minute/hour/day/month/year, etc.) facilitating trend analysis and forward predictability and forecasting. The engines compile, aggregate, analyze, create databases and generate reports at a very high speed. The e-Logic system provides users with real time data collection capability, and one-to-many electronic commerce requests to determine pricing and/or availability of products and services. The e-Logic platform also contains multiple remotely enabled engines and capabilities.

The e-Logic system and method of the present invention can thus uniquely interface with automated decision makers that use the information generated by the aggregation engine to recommend an optimal choice. Results, databases and reports generated by the e-Logic system and method of the present invention can be shared by placing them on a network, by publishing them on the web, or by embedding them in a new e-mail message. This permits searches to be performed on the results, including searches on aggregated text-based e-mail messages and the resulting information being displayed or printed by individual user or by item.

The e-Logic system also allows for the instantaneous switch between Internet browsers and e-mail, word processing packages, spreadsheets, audio mail, video mail, presentation software and OLE objects with just a click of a button. Furthermore, the tool switching may be performed in any sequence (rather than in a pre-defined sequence of, e.g., first launching a browser and then using e-mail). The e-Logic platform thus has a multiple (simultaneously executed) multi-tasking engine capability.

The e-Logic system and method also allows for the simultaneous use of its engines. For example, it allows for the simultaneous creation of multimedia messages and the use of variety of functions and engines while connecting to the Internet, or the use of e-mail and browser functions at the same time.

Although a preferred embodiment of the method and apparatus of the present invention has been illustrated in the accompanying drawings and described in the foregoing detailed description, it is to be understood that the invention is not limited to the embodiment(s) disclosed, but is capable of numerous rearrangements, modifications and substitutions without departing from the spirit of the invention as set forth and defined by the following claims.

What is claimed is:

1. A computer-implemented system for surveying the opinions of a plurality of computer users, comprising:

an authoring and editing engine for creating an enhanced multimedia e-mail message comprising a survey questionnaire interlaced with multimedia objects;

a web command engine capable of launching multiple Internet browsers within a single enhanced multimedia e-mail message;

a communications engine for distributing said enhanced multimedia e-mail message to a plurality of recipients and seeking individualized responses from said recipients to said survey questionnaire;

an aggregation engine for aggregating said individualized responses received from recipients of said enhanced multimedia e-mail message; and an analysis engine for analyzing said aggregated individualized responses and generating a report therefrom.

2. The system of claim 1 for the computer-implemented surveying of the opinions of a plurality of computer users wherein said authoring and editing engine facilitates the creation of multiple layers of multimedia objects.

3. The system of claim 1 for the computer-implemented surveying of the opinions of a plurality of computer users wherein said authoring and editing engine incorporates said multimedia elements directly in said enhanced e-mail message rather than as attachments.

4. The system of claim 1 for the computer-implemented surveying of the opinions of a plurality of computer users wherein said enhanced multimedia e-mail message is distributed to said plurality of recipients over the Internet.

5. The system of claim 1 for the computer-implemented surveying of the opinions of a plurality of computer users wherein said enhanced multimedia e-mail message is distributed to said plurality of recipients over a computer network.

6. The system of claim 1 for the computer-implemented surveying of the opinions of a plurality of computer users wherein said enhanced multimedia e-mail message is distributed to said plurality of recipients using floppy disks.

7. The system of claim 1 for the computer-implemented surveying of the opinions of a plurality of computer users wherein said enhanced multimedia e-mail message is distributed to said plurality of recipients using a peer-to-peer communications protocol.

8. The system of claim 1 for the computer-implemented surveying of the opinions of a plurality of computer users wherein results of analyzing said aggregated individualized responses are interfaced with a generic decision engine that generates a recommendation for an optimal decision based on the aggregated responses to each multimedia object that was the subject of the enhanced multimedia e-mail message.

\* \* \* \* \*